United States Patent
Bassett et al.

[19]

[11] Patent Number: 6,097,594

[45] Date of Patent: *Aug. 1, 2000

[54] RECESSED BEZEL FOR TAPE DRIVE

[75] Inventors: Jonathan D Bassett; Steven F Liepe, both of Ft Collins; Christopher Nichols, Longmont, all of Colo.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/296,092

[22] Filed: Apr. 21, 1999

[51] Int. Cl.[7] .......................... H05K 5/02; G11B 23/087; G06F 13/00

[52] U.S. Cl. .......................... 361/685; 361/683; 360/93; 360/96.5; 242/335; 242/347; 242/347.1

[58] Field of Search ........................ 361/685, 683, 361/684, 724–727; 360/93, 96.5, 97.01, 98.01, 137, 137 D; 312/332.1, 333; 369/75.1–82; 364/708.1; 242/335, 337, 338, 338.4, 339, 347, 347.1

[56] References Cited

U.S. PATENT DOCUMENTS

| | | | |
|---|---|---|---|
| 5,001,584 | 3/1991 | Angellotti | 360/106 |
| 5,488,522 | 1/1996 | Peace et al. | 360/99.06 |
| 5,495,374 | 2/1996 | Hiscox et al. | 360/93 |
| 5,497,955 | 3/1996 | Angellotti et al. | 242/338.4 |
| 5,558,291 | 9/1996 | Anderson et al. | 242/336 |
| 5,612,837 | 3/1997 | Perona | 360/93 |
| 5,613,154 | 3/1997 | Burke et al. | 395/821 |
| 5,659,440 | 8/1997 | Acosta et al. | 360/92 |

FOREIGN PATENT DOCUMENTS

| | | | |
|---|---|---|---|
| 403232604 | 10/1991 | Japan | B65G 1/02 |
| 405325360 | 5/1992 | Japan | G11B 15/68 |
| 405012821 | 1/1993 | Japan | G11B 23/23 |
| 407220436 | 8/1995 | Japan | G11B 23/87 |
| 407261871 | 10/1995 | Japan | G06F 1/16 |

OTHER PUBLICATIONS

Image from www.techmar.com dated Apr. 2, 1998.

*Primary Examiner*—Leo P. Picard
*Assistant Examiner*—Anatoly Vortman

[57] ABSTRACT

The inventive recessed bezel or faceplate allows the tape drive to be recessed within the computer case such that the tape cartridge no longer protrudes from the front of the computer case. The inventive bezel uses finger cavities and a guide mechanism to facilitate tape cartridge insertion and removal.

19 Claims, 2 Drawing Sheets

RECESSED BEZEL FOR TAPE DRIVE

TECHNICAL FIELD OF THE INVENTION

This invention relates in general to a computer system, and in specific to a recessed bezel or faceplate for a tape drive mounted on the computer system.

BACKGROUND OF THE INVENTION

Computer systems, particularly personal computer systems, use a tape drive to back up the data stored on the hard drive. Thus, any data lost from a hard drive failure can be restored from the tape cartridge back up.

To ensure reliability, most tape drives do not have automatic tape insertion mechanisms where the drive moves the tape cartridge into an internal operating position. These drives have many moving parts which reduce reliability of the drive, and also increase the costs of the drive due to the number of the moving parts. Instead, most tape drives have the user push the tape cartridge into the drive and into the operating position. An example of such a tape drive 20 is shown in FIG. 2A. Thus, to allow for the user to easily insert and remove the tape cartridge from the tape drive, the tape drive is designed such that the tape cartridge protrudes from the front of the tape drive and the computer case when the tape cartridge is in the operating position, as shown in FIG. 2B. The bezel or faceplate 21 for the tape drive 20 is flush or even with the computer case 22 and is part of the computer case enclosure 22. The user would insert the tape cartridge 24 into door 23, and push the tape cartridge 24 into the operating position. Thus, in the operating position, the back end of the tape cartridge 24 protrudes out from the front of the bezel 21 of the tape drive 20, as well as the front of the computer case 22. The tape cartridge can now be used in the storing and retrieving of data.

Several problems arise with the prior art arrangement. Since the tape cartridge protrudes from the front of the computer case, the tape cartridge may be physically disturbed, i.e. bumped, which may cause a loss of data if the tape cartridge is bumped during operation. Also, if the tape cartridge is bumped and knocked out of position, a later automatic back up may not occur. Some computer systems now feature a case door that covers the peripheral drive bays. This door helps to keep dirt out of the computer system and enhance the appearance of the computer system. However, the case door cannot be closed with the tape cartridge inserted into the tape drive. Thus, it is impossible to close the door without first removing the tape cartridge. The user is forced to leave the door open while performing read or write operations to the tape, which sometimes interferes with the user's workspace. If the door is left open for extended periods of time, the door may be broken off. Also, leaving the door open reduces the attractiveness of the computer system. Another problem is that some users are not sure if the tape is properly loaded, since the tape is protruding from the computer system.

Therefore, there is a need in the art for a tape drive that does not have the tape cartridge protruding from the front of the computer system case, and does not incur the costs of an automatic tape cartridge insertion mechanism.

SUMMARY OF THE INVENTION

These and other objects, features and technical advantages are achieved by a system and method which recesses the entire tape drive within the computer case such that the tape cartridge no longer protrudes from the front of the computer case.

The tape drive is recessed into the computer so that the back end of the tape cartridge is flush with the computer case when the tape cartridge is in the operating position. A recessed bezel is used to couple the tape drive to the computer case. Since the tape cartridge is flush with the computer case, the door covering the drive bays may be closed when the tape cartridge is in the operating position. Moreover, the tape cartridge is much less likely to be bumped since it is enclosed by the computer case.

To facilitate tape cartridge insertion and removal, a guide mechanism is incorporated in the recessed bezel. The guide mechanism provides a ramping surface for the tape cartridge to be moved along. This ramping surface provides vertical alignment for the tape cartridge. Cavities in the bezel allow the fingers of the user to insert/remove or otherwise manipulate the tape cartridge.

Therefore, it is a technical advantage of the present invention to have a recessed tape drive with a recessed bezel.

It is another technical advantage of the present invention that the computer case door may be closed after the tape cartridge is inserted.

It is a further technical advantage of the present invention that the tape cartridge is protected from direct shock during operations.

It is a still further technical advantage of the present invention that proper tape cartridge insertion depth is flush with the computer case, which is more intuitive than protruding from the case.

It is a still further technical advantage of the present invention that the tape cartridge is guided during insertion.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF THE INVENTION

Figure 1A:
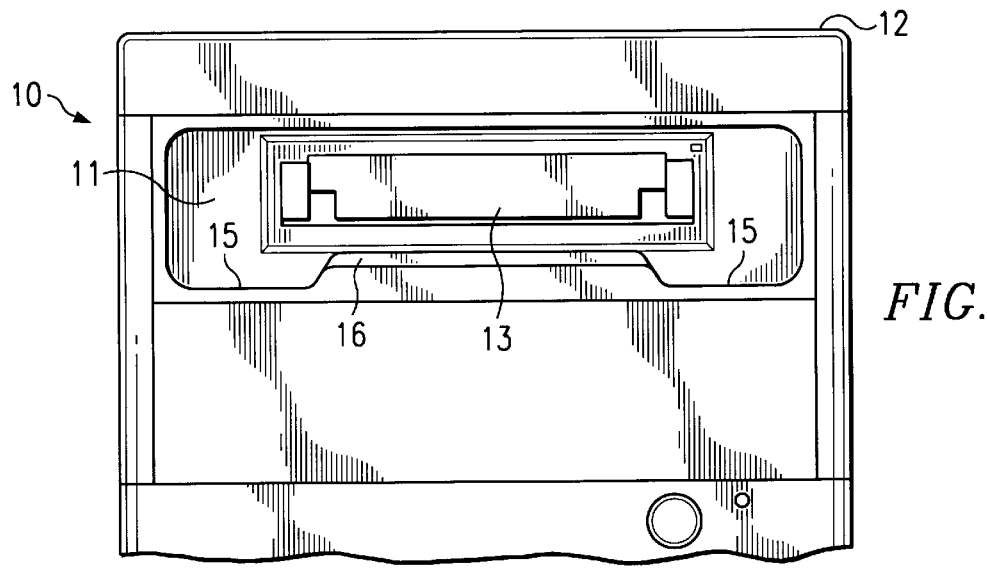
FIGS. 1A and 1B depict the inventive recessed bezel tape drive.
Figure 1B:
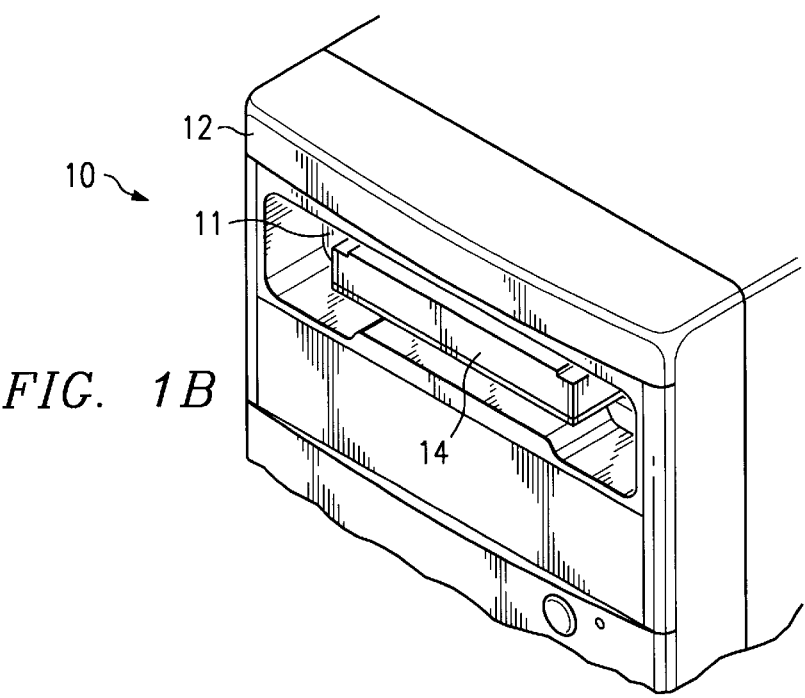

FIG. 1A depicts the inventive recessed tape drive 10 with the recessed bezel or faceplate 11. A portion of the bezel 11 is flush with the front of the computer case 12, and thus, the bezel 11 functions as part of the case enclosure by physically joining the front of the drive mechanism to the front of the computer case 12. The distance that the drive is recessed within the case is such that the inserted cartridge is flush or slightly recessed from the front of the computer case. The user would insert the tape cartridge 14 into door 13, and push the tape cartridge 14 into the operating position, as shown in FIG. 1B. Thus, in the operating position, the back end of the tape cartridge 14 is flush with the front of the computer case 12. Note that the bezel and the tape cartridge may be slightly recessed from the front of the computer case. The slight recess is to allow for a case door to be closed, which would then be flush with the case. The tape cartridge can now be used in the storing and retrieving of data. An example of a tape cartridge is a QIC/Travan cartridge, however, the invention will operate with other types of cartridges.

The recessed bezel is designed such that there is adequate finger clearance for inserting and removing the cartridge. Cavities 15 provide the space necessary to permit the fingers of the user to grip the tape cartridge during insertion and removal of the tape cartridge. A user would grip the tape cartridge on the left and right side portions of the tape cartridge during insertion. The user may use a one-handed grip with the thumb on one side and at least one finger on the other side. Alternatively, the user may use a two-handed grip, with the thumb and at least one finger of each hand gripping a respective side portion of the tape cartridge.

Since the tape drive 10 is recessed, a user may find it difficult to visually align the tape cartridge with the tape drive door 13 during tape cartridge insertion, particularly for a tower personal computer that is located on the floor near the user's workstation. However, this may also be true for desktop personal computers, as well as any computer having a recessed drive. To improve this situation, a cartridge guide surface 16 is included with the bezel 11. This ramped surface 16 assists the user in sliding the tape cartridge into the tape drive. The user places the tape cartridge 14 onto the ramp and pushes the tape into the tape drive door 13. The ramp surface 16 aligns the tape cartridge 14 with the tape drive door 13 and the tape cartridge 14 rides the ramp up to the tape drive door 13. This simplifies alignment of the tape cartridge in the vertical axis. Another guide surface may be placed on a top portion of bezel 11, opposite surface 16. Note that the ramp surface 16 is smaller than the width of the tape cartridge. This provides clearance for the user's fingers/thumbs. However, the size of the ramp surface 16 is a significant portion of the width of tape cartridge. This prevents the tape cartridge from slipping off of the ramp during loading. Similar ramped surfaces may be placed on the left and right sides of the tape drive door for horizontal alignment, although these guides may interfere with the user's fingers/thumbs during insertion.

Figure 1C:
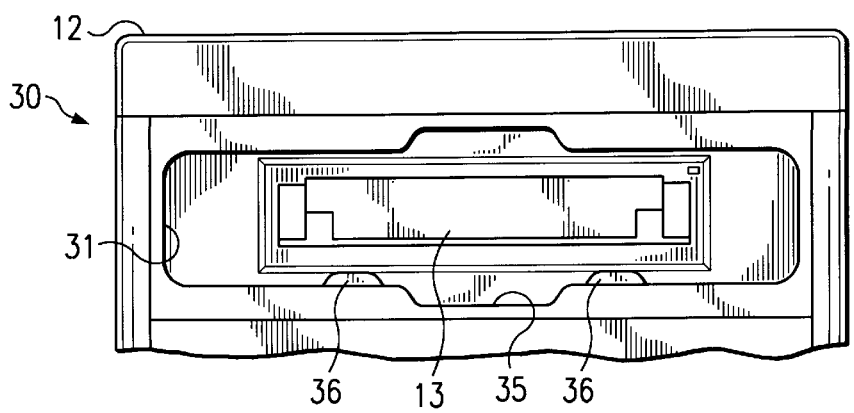
FIG. 1C depicts an alternative embodiment of the inventive recessed bezel shown in FIGS. 1A and 1B.
Figure 2A:
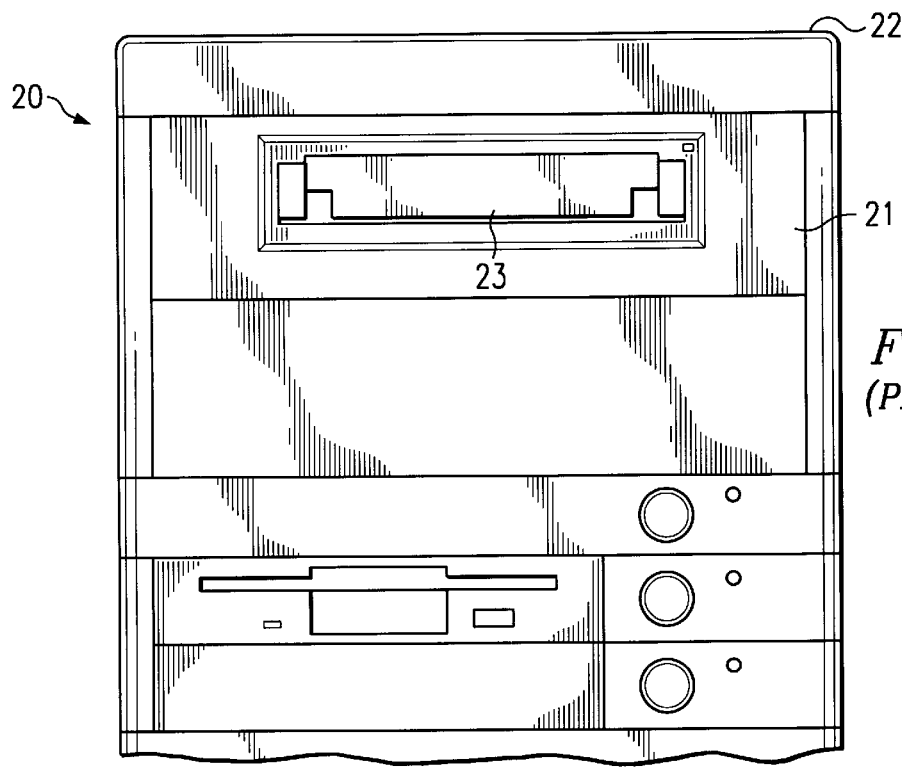
FIGS. 2A and 2B depict a prior art arrangement of a flush bezel tape drive.
Figure 2B:
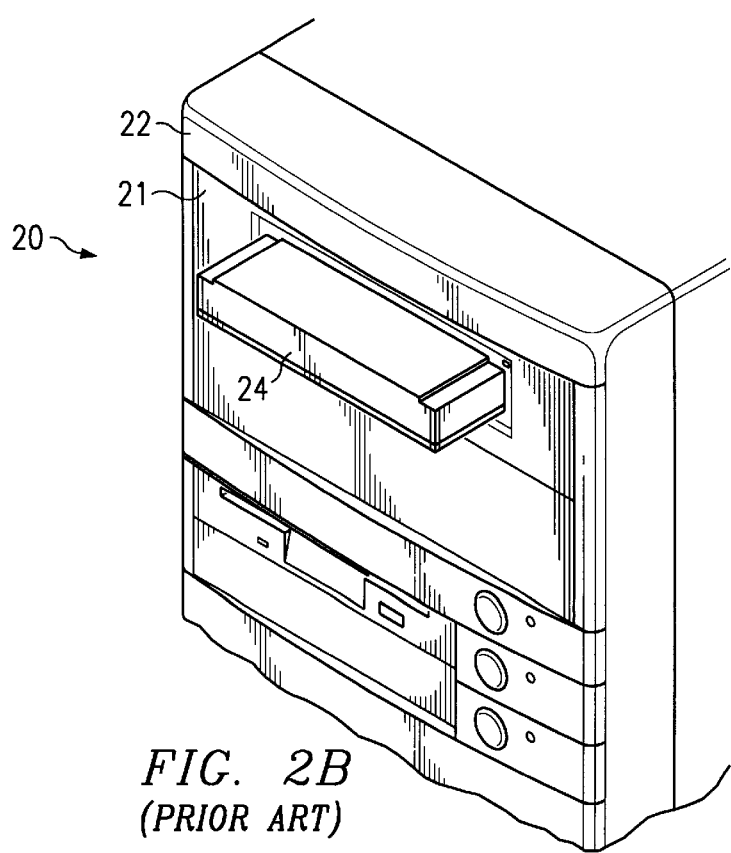

FIG. 1C depicts an alternative embodiment of the recessed bezel of FIGS. 1A and 1B. In this embodiment, finger cavity 35 is in the middle of the bezel 31. Two ramp surfaces 36 are used to guide the tape cartridge into the tape drive door 13. The space between the ramps 36 is selected to allow the passage of 1–2 fingers of a typical user. If a larger space is used then the tape cartridge may slip off of a ramp and into the space between the surfaces. One ramp surface 36 is located on either side of the cavity 35. In this embodiment, the centrally located finger cavity allows for the tape cartridge to be gripped in the center of the tape cartridge. Another pair of guide surfaces may be placed on a top portion of bezel 11, opposite surfaces 36. A user would grip the tape cartridge on the top and bottom portions of the tape cartridge during insertion. Also note that ramped surfaces may be placed on the left and right sides of the tape drive door for horizontal alignment.

Note that the inventive mechanism has been discussed in terms of a tape drive in a computer system. However, the invention would operate with any device that has a removable element that protrudes from the device.

Although the present invention and its advantages have been described in detail, it should be understood that various changes, substitutions and alterations can be made herein without departing from the spirit and scope of the invention as defined by the appended claims.

What is claimed is:

1. A computer system comprising:

a computer case that encloses the computer system;

a recessed device that is mounted in the computer system such that an access point is recessed from a surface of the computer case by a predetermined distance; and a bezel that physically connects a portion of the recessed device to the computer case;

wherein the predetermined distance is substantially equal to the amount of distance that a removable element protrudes from the portion of the recessed device when the removable element is inserted in the recessed device for normal operation.

2. The computer system of claim 1, wherein the bezel comprises:

at least one cavity to allow a user to access the access point.

3. The computer system of claim 1, wherein the bezel comprises:

at least one alignment surface to guide a user to the access point.

4. The computer system of claim 1, wherein:

the recessed device is a tape drive;

the access point is a tape drive door;

the portion is adjacent to the tape drive door; and the predetermined distance is substantially equal to the amount of distance that a tape cartridge protrudes from the portion of the recessed tape drive.

5. The computer system of claim 4, wherein the bezel comprises:

at least one cavity to allow a user to access the tape drive door for manipulation of the tape cartridge.

6. The computer system of claim 5, wherein:

the one cavity is centrally located in a horizontal axis of the tape drive.

7. The computer system of claim 5, wherein the bezel further comprises:

an alignment surface that is centrally located in a horizontal axis of the tape drive, and guides the tape cartridge in the vertical axis of the tape drive for insertion into the tape drive;

wherein the at least one cavity is two cavities, with one cavity located on either side of the alignment surface on the horizontal axis.

8. The computer system of claim 4, wherein the bezel comprises:

at least one alignment surface that guides the tape cartridge in the vertical axis of the tape drive for insertion into the tape drive.

9. The computer system of claim 8, wherein:

the one alignment surface is centrally located in a horizontal axis of the tape drive.

10. The computer system of claim 8, wherein the bezel further comprises:

a cavity that is centrally located in a horizontal axis of the tape drive, and allows a user to access the tape drive door for manipulation of the tape cartridge;

wherein the at least one alignment surface is two surfaces, with one surface located on either side of the cavity on the horizontal axis.

11. The computer system of claim 1, wherein the computer case comprises:

a case door that is operable to enclose the recessed device and the bezel.

12. A computer system comprising:

a computer case that encloses the computer system;

a recessed tape drive that is mounted in the computer system such that a tape drive door is recessed from a surface of the computer case by a predetermined distance that is substantially equal to the amount of distance that a tape cartridge protrudes from the portion of the recessed tape drive; when the tape cartridge is inserted in the recessed tape drive for normal operation and a bezel that physically connects a portion of the tape drive that is adjacent to the tape drive door to the computer case;

wherein the bezel includes at least one cavity to allow a user to access the tape drive door for manipulation of the tape cartridge, and at least one alignment surface that guides the tape cartridge in the vertical axis of the tape drive for insertion into the tape drive.

13. The computer system of claim 12, wherein:

the one alignment surface is centrally located in a horizontal axis of the tape drive; and the at least one cavity is two cavities, with one cavity located on either side of the alignment surface on the horizontal axis.

14. The computer system of claim 12, wherein:

the one cavity is centrally located in a horizontal axis of the tape drive; and the at least one alignment surface is two surfaces, with one surface located on either side of the cavity on the horizontal axis.

15. The computer system of claim 12, wherein the computer case comprises:

a case door that is operable to enclose the recessed device and the bezel.

16. A method for recessing a tape drive in a computer system comprising the steps of:

providing a computer case that encloses the computer system;

mounting the tape drive in the computer system such that a tape drive door is recessed from a surface of the computer case by a predetermined distance that is substantially equal to the amount of distance that a tape cartridge protrudes from the portion of the recessed tape drive; when the tape cartridge is inserted in the recessed tape drive for normal operation and providing a bezel that physically connects a portion of the tape drive that is adjacent to the tape drive door to the computer case;

wherein the bezel includes at least one cavity to allow a user to access the tape drive door for manipulation of the tape cartridge, and at least one alignment surface that guides the tape cartridge in the vertical axis of the tape drive for insertion into the tape drive.

17. The method of claim 16, wherein:

the one alignment surface is centrally located in a horizontal axis of the tape drive; and the at least one cavity is two cavities, with one cavity located on either side of the alignment surface on the horizontal axis.

18. The method of claim 16, wherein:

the one cavity is centrally located in a horizontal axis of the tape drive; and the at least one alignment surface is two surfaces, with one surface located on either side of the cavity on the horizontal axis.

19. The method of claim 16, wherein:

the computer case includes a case door that is operable to enclose the recessed device and the bezel.

* * * * *

UNITED STATES PATENT AND TRADEMARK OFFICE
CERTIFICATE OF CORRECTION

PATENT NO.    : 6,097,594
DATED         : August 1, 2000
INVENTOR(S)   : Jonathan D. Bassett et al.

It is certified that error appears in the above-identified patent and that said Letters Patent is hereby corrected as shown below:

Column 5,
Line 12, after "tape drive" delete ";"
Line 13, after "operation" insert -- ; --

Column 6,
Line 11, after "tape drive" delete ";"
Line 12, after "operation" insert -- ; --

Signed and Sealed this

Twenty-third Day of July, 2002

Attest:

JAMES E. ROGAN
Attesting Officer          Director of the United States Patent and Trademark Office